United States Patent [19]

Solcz

[11] Patent Number: 5,361,894
[45] Date of Patent: Nov. 8, 1994

[54] CONVEYOR RAIL

[75] Inventor: Mike Solcz, Clarkston, Mich.

[73] Assignee: Valiant Machine & Tool, Inc., Troy, Mich.

[21] Appl. No.: 122,653

[22] Filed: Sep. 17, 1993

[51] Int. Cl.⁵ .............................................. B65G 21/00
[52] U.S. Cl. .................................. 198/860.1; 198/790
[58] Field of Search ............... 198/860.1, 860.2, 860.3, 198/780, 790; 193/35 R

[56] References Cited

U.S. PATENT DOCUMENTS

| | | | |
|---|---|---|---|
| 5,147,024 | 9/1992 | Yamada | 198/790 X |
| 5,148,909 | 9/1992 | Becker et al. | 198/780 |

FOREIGN PATENT DOCUMENTS

| | | | |
|---|---|---|---|
| 2805343 | 8/1979 | Germany | 198/790 |
| 3017942 | 12/1981 | Germany | 198/790 |

*Primary Examiner*—Cheryl Gastineau
*Attorney, Agent, or Firm*—Gifford, Groh, Sprinkle, Patmore and Anderson

[57] ABSTRACT

An improved conveyor radii is provided for us with a conveyor system of the type in which two rails are spaced apart and parallel with each other and define a conveyor line therebetween. The rails are adapted to rotatably support a plurality of longitudinally spaced axles which extend between the rails and so that a portion of at least one of the axles protrudes laterally outwardly from one of the rails. The improved rail comprises an elongated one piece body which is preferably an extrusion. The body is generally L-shaped in cross sectional shape and thus has a lower and generally horizontal leg and an inner and generally vertical leg. A shield is removably secured between the upper and outer free ends of the vertical leg and horizontal leg, respectively, which encloses the outwardly protruding portion of the axles. The shield, however, is removable when required in order to provide access to the protruding ends of the axles for maintenance purposes.

6 Claims, 1 Drawing Sheet

CONVEYOR RAIL

BACKGROUND OF THE INVENTION

I. Field of the Invention

The present invention relates to an improved conveyor rail for a conveyor system.

II. Description of the Prior Art

There are a number of previously known conveyor systems which include a pair of elongated rails which are spaced apart and parallel to each other and define a conveyor line between them. The rails are adapted to rotatably support a plurality of longitudinally spaced axles along the conveyor line which extend between the rails. Furthermore, at least one end of at least some of the axles protrude laterally outwardly from the rails. Sprocket wheels or the like are secured to this outwardly protruding portion of the axles for connection with the conveyor drive system.

A disadvantage of the previously known rails for conveyor systems is that the rails are generally U-shaped having an upper and lower horizontal leg and an inner and vertically extending central leg extending between the upper and lower horizontal legs. The sprockets which are attached to the outwardly protruding portion of the axles are contained within the cavity formed by the U-shaped rail so that the rail effectively encloses the sprockets secured to the end of the conveyor axles.

These previously known U-shaped conveyor rails thus effectively prevent workers from inadvertently contacting the rail and injuring themselves. Unfortunately, the U-shaped rails also prevent or limit access to the outwardly protruding ends of the axles as well as to the sprockets or drive pulleys which are connected to the outwardly protruding ends of the axles. Consequently, these previously known rail constructions make it difficult to perform maintenance procedures on the axles, their associated drive sprockets, chains and the drive system for the conveyor.

A still further disadvantage of these previously known conveyor rails is that it is frequently necessary for the conveyor rails to support accessories, such as limit switches, sensors, and the like, for use in connection with the conveyor system. It has been the previously known practice to individually measure mounting holes in the conveyor rails for these accessories when fabricating the conveyor rails for a particular conveyor system. Such a procedure, however, is time consuming and thus it increases the overall labor costs for the conveyor system.

SUMMARY OF THE PRESENT INVENTION

The present invention provides an improved conveyor rail for a conveyor system which overcomes all of the above mentioned disadvantages.

In brief, the improved conveyor rail of the present invention comprises an elongated one piece body. Preferably, the body is from a single metal extrusion for low cost manufacture.

The rail body is generally L-shaped in cross sectional shape and thus has a lower and generally horizontal leg and a generally vertical leg integrally formed with the horizontal leg. The lower horizontal leg is secured to the frame for the conveyor while the vertical leg forms the support for the axles which form the conveyor line.

A shield is also preferably detachably secured between the free ends of the horizontal and vertical leg of the rail body. Additionally, the shield is generally L-shaped in cross sectional shape so that, with the shield secured to the rail, the rail and shield together form a generally rectangular cavity in which the drive sprockets and drive chains for the conveyor system are contained. Thus, the shield protects workers against injury from the drive system of the conveyor system.

The elongated body also preferably includes at least one, and preferably several, longitudinally extending T-slots along the length of the conveyor rail. Accessories, such as sensors, limit switches and the like, can then be easily mounted to the T-slot as required along the conveyor line. Furthermore, in the event that the longitudinal position of the accessory requires adjustment, the longitudinal position of the accessory can be easily changed by simply loosening the T-nut, sliding the accessory to the correct position, and then retightening the T-nut.

Other T-slots can also be formed in the elongated body for securing the rail to a supporting frame for the conveyor system.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
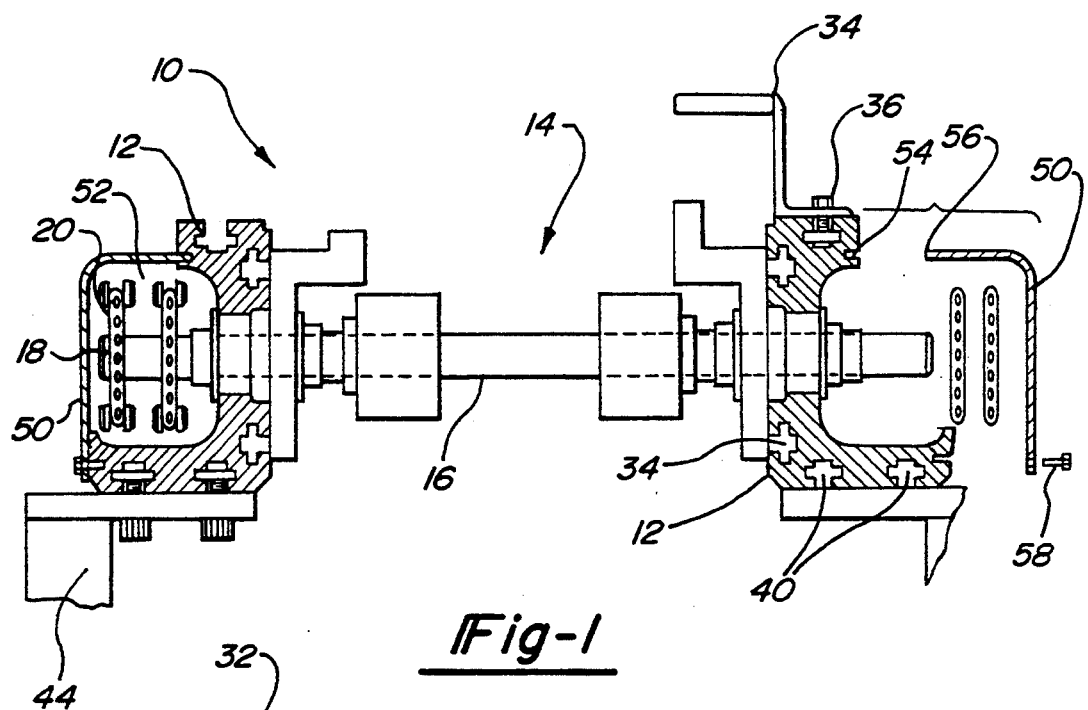
FIG. 1 is an exploded cross sectional view illustrating a preferred embodiment of the present invention.

With reference first to FIG. 1, a cross sectional view of a conveyor system 10 is thereshown having two conveyor rails 12. The conveyor rails 12 are elongated, spaced apart and generally parallel to each other thus defining a conveyor line 14 therebetween.

A plurality of longitudinally spaced conveyor rollers 16 (only one illustrated) extend between the rails 12 and are rotatably supported by the rails 12. Furthermore, at least one end 18 of at least some of the axles 16 protrude laterally outwardly from its associated rail 12. Drive sprockets 20 or the like are then secured to this laterally outwardly extending end 18 of the axle 16 in order to power the axles 16.

Figure 2:
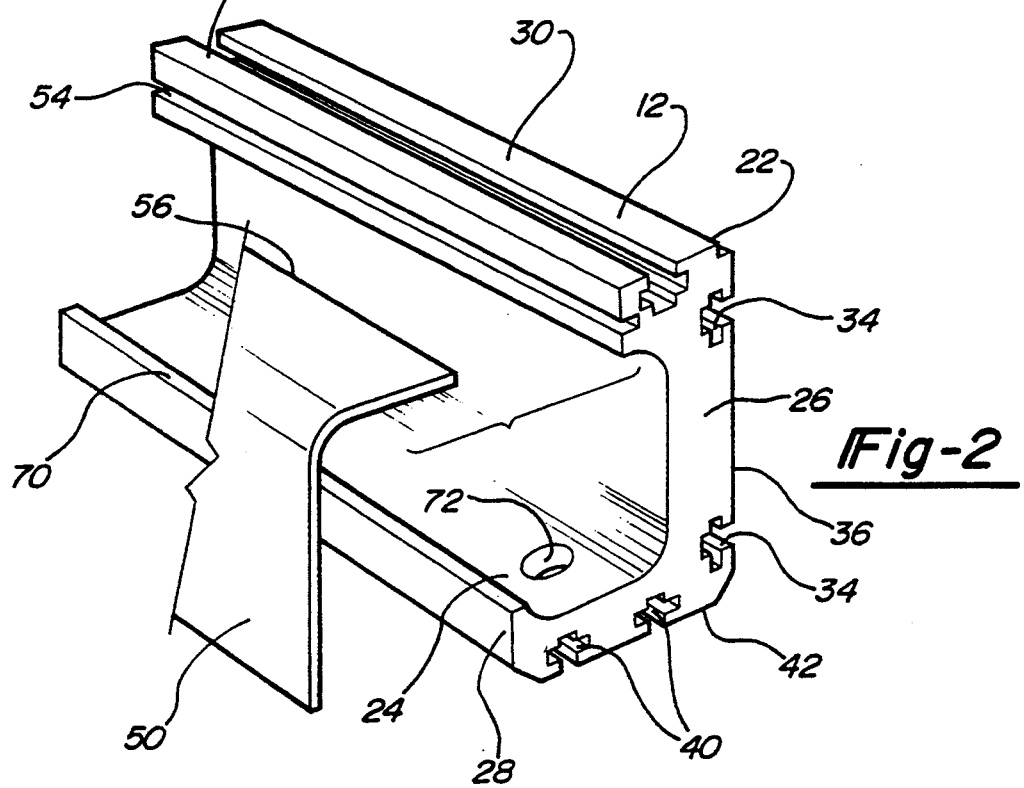
FIG. 2 is an exploded perspective view illustrating the preferred embodiment of the present invention.

With reference now to FIGS. 1 and 2, each conveyor rail 12 comprises a one piece elongated body 22 which is preferably formed from a metal extrusion. The body 22 is generally L-shaped in cross sectional shape, thus having a lower horizontal leg 24 and an inner vertical leg 26. The horizontal leg 24 has a laterally outer free end 28 while, similarly, the vertical leg 26 has an upper free end 30.

An upwardly extending lip 70 is provided at the free end 28 of the horizontal leg 24. This lip 70 contains only oil drippage within the body 22 and oil drainage holes 72 can be drilled through the horizontal leg as desired.

As best shown in FIG. 2, an elongated T-slot 32 is preferably formed along the upper free end 30 of the vertical leg 26. This T-slot 32 is used to secure accessories 34 (FIG. 1), such as sensors, limit switches or the like, to the conveyor rail by using a conventional T-nut 36. Adjustment of the longitudinal position of the accessory 34 is easily achieved by simply loosening tile T- bolt 36, moving the accessory 34 to its adjusted longitudinal position, and then retightening the T-bolt 36.

Still referring to FIGS. 1 and 2, the rail preferably includes a pair of longitudinally extending T-slots 34 formed along the inner face 36 of the vertical leg 26. These T-slots 34 are utilized to secure guards, limit switches or the like to the conveyor line 14. Like the accessories 34, the position of the guards can be easily changed by sliding the guard to the new desired position along its associated T-slot 34 and then retightening the guard or the like to the rail 12.

The rail 12 also includes a pair of longitudinally extending T-slots 40 which are formed along the bottom 42 of the horizontal leg 24. These T-slots 40 are used to secure the rail 12 to a support frame 44 (FIG. 1) for the conveyor system.

In the preferred embodiment of the invention, a shield 50 is provided for enclosing the axle ends 18 with their drive sprockets 20 and thus protecting workers. The shield 50 is elongated and generally L-shaped in cross sectional shape and extends between the free ends 28 and 30 of the horizontal leg 24 and vertical leg 26, respectively. In doing so, the shield 50 together with the rail 12 forms a generally rectangular cavity 52 (FIG. 1) which encloses the sprockets and axle ends 18.

Although any conventional means can be used to secure the shield 50 to the rail 12, preferably the rail 12 includes a longitudinally extending slot 54 adjacent the free end 30 of the vertical leg 26. This slot 54 receives a top edge 56 of the shield 50. With the top edge 56 of the shield 50 positioned within the slot 54, conventional fasteners 58 (FIG. 1) then secure the lower edge 60 of the shield 50 to the rail 12.

When maintenance to the axle ends 18 or drive system of the conveyor is required, the shield 50 is quickly and easily removed from the rail 12 by merely unscrewing the fasteners 58 and removing the shield 50. Upon doing so, free access to the drive sprockets is enabled thus facilitating any required maintenance. When the maintenance is completed, the shield 50 can be easily resecured to the rail 12 by the fasteners 58.

It can thus be seen that the present invention provides a unique rail for a conveyor system which facilitates maintenance to the drive system for the conveyor. Furthermore, the elongated T-slots which extend along the length of the conveyor rail 12 not only facilitate the adjustment of scissors, limit switches, guards and the like to the conveyor system, but also allow the rails to be used in a modular fashion in which a single rail 12 can accommodate different conveyor designs.

Having described my invention, however, many modifications thereto will become apparent to those skilled in the art to which it pertains without deviation from the spirit of the invention as defined by the scope of the appended claims.

I claim:

1. A conveyor rail for use with a conveyor system of the type in which two rails are spaced apart and parallel with respect to each other and form a conveyor line therebetween, said rails adapted to support a plurality of axles which extend between the rails and so that a portion of at least one of the axles protrudes laterally outwardly from the rail, said conveyor rail comprising:

a one piece elongated body, said body being generally L-shaped in cross sectional shape and having a lower and generally horizontal leg and a generally vertical leg said generally horizontal leg further comprising an upwardly extending lip at a free end of said horizontal leg and means on said horizontal leg for trapping and thereafter draining lubricants from an upper surface of said horizontal leg, whereby the laterally outwardly protruding portion of the axle is accessible.

2. The invention as defined in claim 1 wherein said body comprises an extrusion.

3. The invention as defined in claim 1 and comprising a cover adapted to extend between a free end of said horizontal leg and a free end of said vertical leg and means for securing said cover to said body.

4. The invention as defined in claim 3 wherein said body includes a longitudinally extending slot adjacent said free end of said vertical leg, said cover having an edge adapted to be slidably received in said slot, and wherein said means for securing said cover to said body comprises fasteners for securing said cover to said free end of said horizontal leg.

5. The invention as defined in claim 1 wherein said body includes at least one longitudinally extending T-slot.

6. The invention as defined in claim 1 wherein said body includes a plurality of longitudinally extending T-slots.

* * * * *